United States Patent [19]
Reid

[11] Patent Number: 5,079,831
[45] Date of Patent: Jan. 14, 1992

[54] METHOD OF MAKING A DUAL STRIPE MAGNETIC HEAD

[75] Inventor: James Reid, Santa Ynez, Calif.

[73] Assignee: Applied Magnetics Corporation, Goleta, Calif.

[21] Appl. No.: 652,134

[22] Filed: Feb. 7, 1991

[51] Int. Cl.$^5$ ............................................. G11B 5/42
[52] U.S. Cl. ................................. 29/603; 360/113; 360/125; 427/130
[58] Field of Search ............ 29/603; 427/130, 131; 360/113, 122, 125–127

[56] References Cited

U.S. PATENT DOCUMENTS

| | | |
|---|---|---|
| 3,813,692 | 5/1974 | Brock et al. . |
| 3,879,760 | 4/1975 | Lazzari . |
| 3,903,594 | 9/1975 | Koneval . |
| 4,012,781 | 3/1977 | Lin . |
| 4,130,847 | 12/1978 | Head et al. . |
| 4,546,541 | 10/1985 | Reid . |
| 4,571,651 | 2/1986 | Reid et al. . |
| 4,663,684 | 5/1987 | Kamo et al. . |
| 4,738,021 | 4/1988 | McClure . |
| 4,939,837 | 7/1990 | Krounbi .............................. 29/603 |

OTHER PUBLICATIONS

G. V. Kelley and R. A. Ketcham, "An Analysis of the Effect of Shield Length on the Performance of Magnetoresistive Heads," IEEE Trans. Magn., vol. MAG-14, Sep. 1978, pp. 515–516.

N. H. Yeh, "A Symmetrick Crosstalk of Magnetoresistive Head," IEEE Trans. Magn., vol. MAG-18, Nov. 1982, pp. 1155–1157.

G. V. Kelley, et al., "High-Track-Density, Coupled Film Magnetoresistive Head," IEEE, vol. Magn. 17, No. 6, Nov., 1981, pp. 2890–2891.

*Primary Examiner*—Carl E. Hall
*Attorney, Agent, or Firm*—Knobbe, Martens, Olson & Bear

[57] ABSTRACT

The present invention is a method for constructing dual stripe magnetoresistive read heads by depositing each stripe on a separate substrate and then bringing the stripes together in the assembly process. The method of the present invention first forms two substrates and deposits a layer from which conductor leads and stripes will be defined upon them. Connecting pads are provided to allow all the conductor leads to terminate on one substrate and connect with a standard flex circuit. After the leads and stripes are defined, a layer of insulation is then placed over the stripes, leads and substrates. Finally, the substrates are shaped to the preferred from and mounted together to form a recording head with the magnetoresistive stripes precisely positioned adjacent to each other. Advantageously, this method permits the deposition of the MR strips at the same time and under the same deposition conditions.

18 Claims, 6 Drawing Sheets

METHOD OF MAKING A DUAL STRIPE MAGNETIC HEAD

BACKGROUND OF THE INVENTION

The present invention relates generally to the manufacture of recording elements used to retrieve information from disks, tapes and other magnetic media. In particular, the present invention relates to the construction of read heads. More particularly, the present invention relates to a method of making magnetic read heads that use magnetoresistive material.

It is known in the art to use magnetoresistive material as part of a magnetic read head. Typically, a thin rectangular sheet of magnetoresistive material referred to as a stripe is used to sense the magnetic field stored on the recording medium. The magnetoresistive (MR) stripe is preferably mounted in a plane perpendicular to the recording medium. The MR stripe has a conductor lead attached at each opposite end. The conductor leads carry a constant sense current through the MR stripe. The current enters through one lead, continues along the stripe, and exits from the second lead. The MR stripe senses the magnetic field presented by the recording medium because the resistivity of the MR stripe changes depending on the direction of magnetization of the field. Therefore, if the current applied remains constant, changes in the voltage across the MR stripe will reflect changes in the magnetic field applied by the recording medium since the changes in voltage correspond to changes in the resistance of the MR stripe.

In a dual stripe magnetic read head, two magnetoresistive stripes measure the field presented by magnetic medium. Preferably, both stripes are placed perpendicular to the magnetic recording medium and parallel to each other. For proper operation of the dual stripe magnetic head and for biasing purposes, the two MR stripes must be precisely aligned and placed as close together as possible, yet electrically insulated.

Methods known in the art usually construct dual stripe magnetic heads by fabricating the stripes one on top of another with an insulator between on the same wafer. Fabrication methods such as vacuum deposition and photolithography are often used to construct dual stripe MR heads because each stripe is very thin, typically on the order of 200 angstroms, and must be positioned very accurately.

The prior art methods of constructing of a dual stripe magnetoresistive head typically begin with a wafer that has a planar surface. If the wafer is magnetic ferrite, which would act as the MR shield, the first layer deposited on the wafer would be the bottom gap, usually aluminum oxide. If a non-magnetic substrate is used, then a soft magnetic material would be the first layer, which would establish a shield for the MR layer, and then the bottom gap is deposited on top of it. A layer of magnetoresistive material is deposited on the wafer to form a first MR stripe. Next, a layer of conductive material is deposited on the surface of the wafer to form two conductor leads. The leads are positioned so that the first MR stripe is deposited so that it electrically connects the two conductor leads. The surface of the wafer, the conductor leads, and the first stripe are then covered with a layer of insulation. Another layer of magnetoresistive material is deposited on the insulation to form a second stripe. Layering techniques like vacuum deposition and photolithography are used to construct the head because they allow the second stripe to be positioned parallel to and directly above the first stripe. Another layer of conductor material is then deposited on the insulation to form two conductor leads with the second stripe interconnecting the leads. A top gap is deposited on top of the second stripe, preferably the same thickness and material as the bottom gap. Next, the parts are cut out and a superstrate of ferrite is placed on top. If the superstrate is non-magnetic, then a soft shield is deposited on the top gap and then the superstrate is placed on top. In tape heads, non-conducting nickel zinc ferrite is typically used as the substrate and supersubstrate to eliminate the chance of shorting.

As the need to place the magnetoresistive stripes closer together for proper biasing and for increased sensitivity of heads has developed, several problems have arisen with the methods currently known for constructing dual stripe magnetic heads. The methods presently used to construct dual stripe magnetic heads often fail to keep the stripes and leads electrically insulated when the stripes are placed very close together. With the prior art method described above, there is a high probability that the stripes will short-circuit because the insulation between them is very thin. When the second stripe and its leads are deposited on top of the insulation and first stripe, it often penetrates through the insulation making contact with the other stripe and its leads.

Another problem with prior art construction methods is that the thickness and composition of the two stripes often varies. For optimum performance of the head, the two stripes should have the identical thickness and composition. However, the prior art deposits the stripes in two separate layering processes. For example, after the first stripe has been deposited in a layering process, a layer of insulation is placed over the stripe, and then the second stripe is deposited in another layering process. This results in inconsistencies in thickness and composition of the stripes because it is difficult to achieve the same thickness and composition for the stripes when they are deposited in different layering processes.

SUMMARY OF THE INVENTION

The present invention advantageously overcomes these problems by providing an improved method for constructing dual stripe magnetic heads. The improved method produces a dual stripe magnetic head by mounting the MR stripes on separate areas of substrate and then positioning the stripes close together in the assembly process. A first MR stripe and its conductor leads are placed on a first area of substrate and a second MR stripe and its conductor leads are placed on the second area of substrate. The MR stripes are then covered with a layer of insulation. Next, the first stripe on the first area of substrate is positioned very close to the second stripe on the second area of substrate by assembling the first and second areas of substrate together.

The two stripes must be aligned very precisely for proper operation of the head. When the areas of substrate are assembled, the MR stripe on the first area of substrate must be positioned directly above and very close to the MR stripe of the second area of substrate. Desirably, the stripes are optically aligned using targets on the first and second areas of substrate. The first area of substrate may have a greater length and a section reduced in height so that the targets of both areas of substrate may be viewed to optically align the substrates for assembly together. Therefore, the disclosed method allows the MR stripes to be accurately placed very close together and greatly decreases the chances of contact between the two stripes and their leads.

Advantageously, the method provides a means of constructing a dual stripe magnetic head that allows the MR stripes to be placed very close together but electrically insulated.

Desirably, the method also reduces the possibility of electrical contact between the magnetoresistive stripes by depositing the stripes on separate areas of substrate and assembling the areas of substrate together.

Advantageously, the method permits the exact alignment of the magnetoresistive stripes of a magnetic head assembly by aligning the stripes optically in the assembly process.

The preferred method of the present invention produces a dual stripe magnetic head in which the stripes have nearly identical thickness and composition thereby eliminating the uniformity problems of the prior art. The nearly uniform thickness of the stripes is advantageously produced with the preferred method since both MR stripes can be placed on the same wafer in a single layering process. The wafer can then be divided and the MR stripes aligned together in the assembly process.

The method desirably also allows all the leads to terminate on a single substrate for connection to a standard flex circuit. Thin gold pads advantageously provide an electrical path to connect the leads attached on the first area of substrate to the leads on the second area of substrate when the substrates are assembled together.

DESCRIPTION OF THE PREFERRED EMBODIMENT

Figure 1:
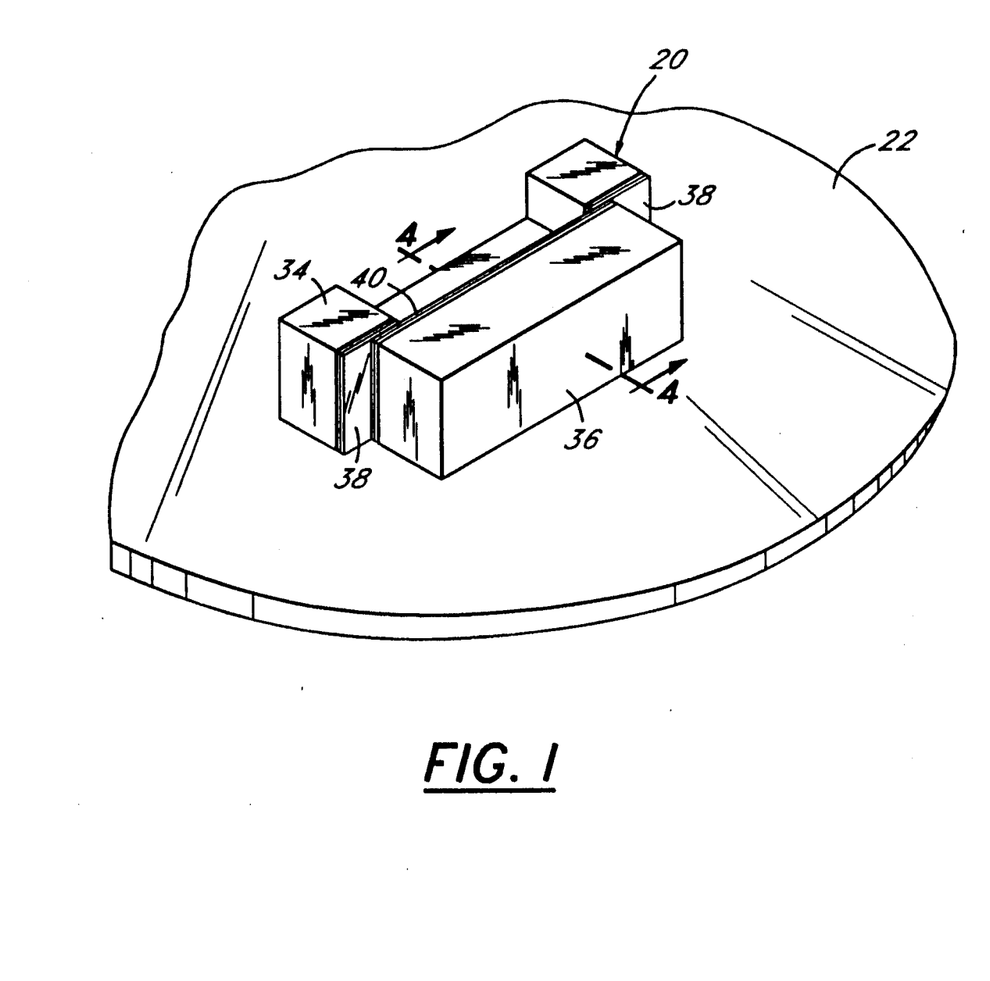
FIG. 1 is a perspective view of a dual stripe magnetic head made according to the method of the present invention.

Referring to FIG. 1, a dual stripe magnetic head 20 produced by the preferred method of the present invention is illustrated. The dual stripe magnetic head 20 is typically used to retrieve information from a recording medium 22 as shown in FIG. 1 by measuring the changes in the magnetic field as the head 20 moves across the recording medium 22. The dual stripe magnetic head 20 is usually placed in a head assembly or slider (not shown) that positions the head 20 near the recording medium 22 so that the magnetic field may be sensed. The dual stripe magnetic head 20 retrieves information from the recording medium 22 by measuring the changes in the direction of the magnetic field presented by the recording medium 22.

Figure 5:
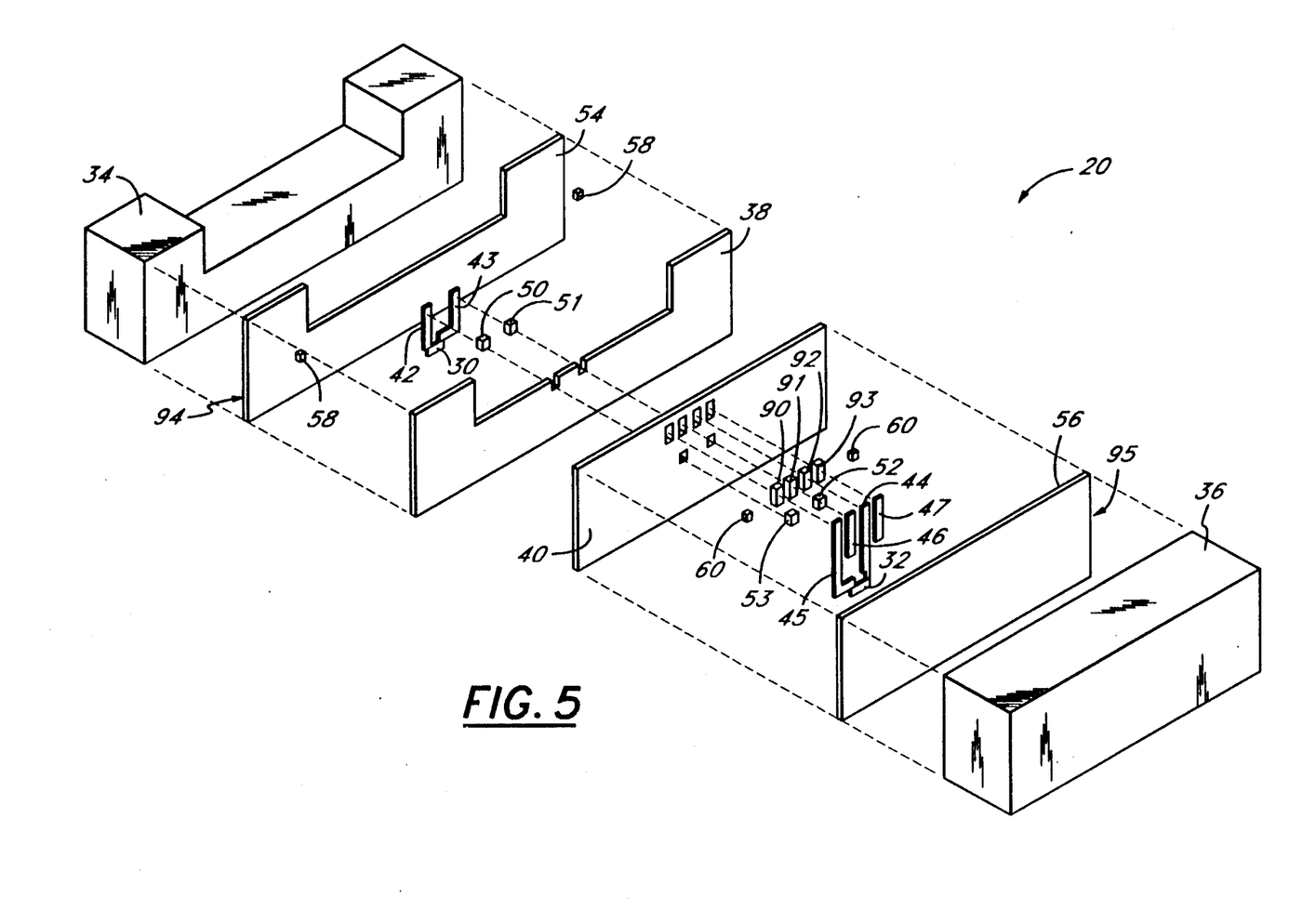
FIG. 5 illustrates an exploded perspective view of dual stripe magnetic head of the present invention.

As best shown in FIG. 5, a preferred embodiment of the dual stripe magnetic head 20 constructed in accordance with the method of the present invention includes: a first magnetoresistive stripe 30 deposited on a first or top gap layer 94 which in turn is itself deposited on a first area of substrate 34 ("first substrate 34") of nickel zinc ferrite, and a second magnetoresistive stripe 32 deposited on a second or bottom gap layer 95 which in turn is itself deposited on a second area of substrate 36 ("second substrate 36") of nickel zinc ferrite. It should be understood that for purposes of this application a "gap layer" of material having a very low magnetic permeability relative the adjacent MR stripe. The preferred embodiment of the dual stripe magnetic head 20 further comprises several long and short conductor leads 42-47 and several lead connectors or connecting pads 50-53 and several flex connectors or connecting pads 90-93 for applying current through the first and second magnetoresistive stripes 30 and 32, as well as a first insulation layer 38 and a second insulation layer 40. Desirably, the stripes 30 and 32 and the long and short conductor leads 42-47 are formed as a single unit, to avoid adding extra thickness to the layer. It is important to note that while the present invention will be described below as a single track magnetic head, it should be understood that the present method may be used to construct magnetic heads having any number of tracks. The substrates are assumed to be nickel zinc ferrite for simplicity, although it will be readily apparent to those of skill in the art, if another material were used, as is common for disk heads, a soft magnetic shield layer would be utilized between the first and second substrates and the top and bottom gap layers, respectively.

The dual stripe magnetic head 20 of the present invention measures the orientation of the magnetic fields stored on the recording medium 22 with the first and second stripes 30 and 32 of magnetoresistive material. The magnetoresistive effect of the material causes the resistivity of the stripes 30 and 32 to change depending on the angle between the direction of magnetization and the current-density vector. Thus, when constant current is applied through the first and second magnetoresistive stripes 30 and 32, the voltage across the stripes 30 and 32 will correspond to changes in the magnetic field presented by the recording medium 22.

In the dual stripe magnetic head 20, the first and second insulation layers 38 and 40 separate the first and second magnetoresistive stripes 30 and 32 and their respective substrates 34 and 36. The stripes 30 and 32 must be separated for proper operation of the head 20 and for biasing purposes. As shown in FIG. 1, the head 20 has an exterior formed by the first and second layers of insulation 38 and 40 which are located between the first and second substrates 34 and 36. At the bottom of the head 20, sufficient portions of the first and second layers of insulation are removed so that the lower edges of the first and second magnetoresistive stripes 30 and 32 are exposed enabling the resistivity of the stripes to be changed by the magnetic fields on the recording medium 22.

In FIGS. 2-5, the configuration of the components of the dual stripe magnetic head 20 is illustrated. The first and second substrate 34 and 36 serve as the foundation upon which the other components of the magnetic head 20 are deposited. In a preferred embodiment, the substrates 34 and 36 are constructed from materials that exhibit good wear characteristics, and high thermal conductivity. Additionally, it is advantageous to use materials that can be precision machined for the substrates 34 and 36. For example, the first and second substrates 34 and 36 can be made of materials such as Ni-Zn ferrite, glass, oxidized silicon, or a mixture of aluminum oxide and titanium carbide.

Figure 2:
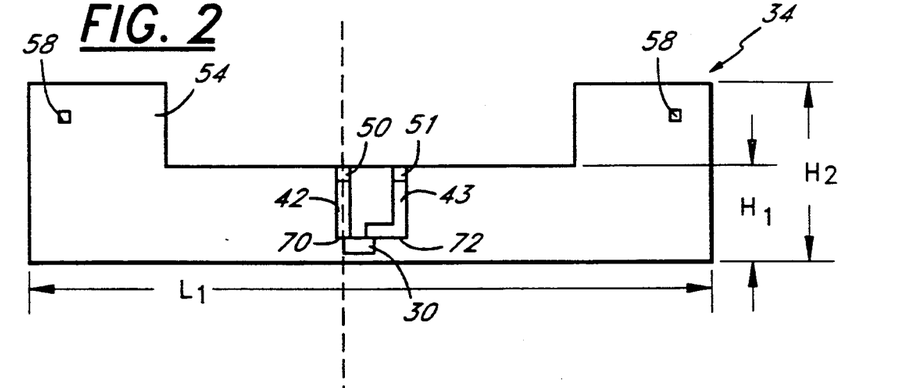
FIG. 2 is a front plan view of the first substrate of the dual stripe magnetic head of FIG. 1 and components deposited thereon.
Figure 3:
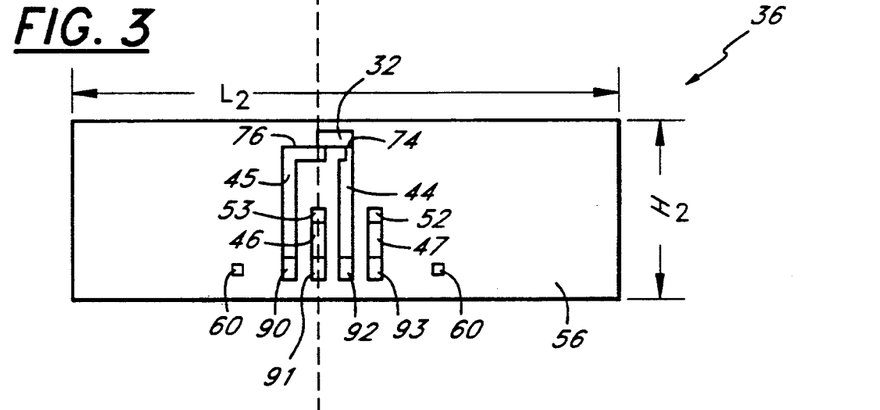
FIG. 3 is a rear plan view of the second substrate of the dual stripe magnetic head of FIG. 1 and components deposited thereon.

The first and second substrates 34 and 36 are advantageously shaped so that the first and second magnetoresistive stripes 30 and 32 may be optically aligned for precise positioning of the stripes. As illustrated in FIGS. 2 and 3, both the first and second substrates 34 and 36 are generally rectangular blocks. Preferably, the length (L1) of the first substrate 34 is greater than the length (L2) of the second substrate 36. Also, the height (H1) near the center of the first substrate 34 is preferably less than the height (H2) of the second substrate 36. These height and length differences allow portions of a front side 54 of the first substrate 34 and a rear side 56 of the second substrate 36, although covered by their respective insulation layers 38 and 40 of transparent aluminum oxide, to be viewed when the substrates 34 and 36 are assembled together with these sides 54 and 56 facing each other. As discussed in detail below, since portions of the front and rear sides 54 and 56 remain visible when the dual stripe magnetic head 20 is assembled, optical targets 58 and 60 on the visible portions of the front and rear sides 54 and 56 can be used for precision alignment of the first and second substrates 34 and 36. Thus, precise positioning better than that resulting from photolithography can be achieved.

Referring now to FIGS. 2-5, the placement and interconnection of the magnetoresistive stripes 30 and 32, the long and short conductor leads 42-47 and the connecting pads 50-53 and 90-93 will be described. All of these components of the dual stripe magnetic head 20 are deposited on the substrates 34 and 36. In a preferred embodiment, the long and short conductor leads 42-47 are thin strips of highly conductive material such as gold, copper, titanium, nickel iron or aluminum. These conductor leads 42-47 are used to apply current to the first and second magnetoresistive stripes 30 and 32. There are four short conductor leads 42, 43, 46 and 47, and two long conductor leads 44 and 45. Two short conductor leads 42 and 43 are attached on a front side 54 of the first substrate 34. As illustrated in FIGS. 2 and 5, the two conductor leads 42 and 43 on the first substrate 34 begin at the top of the first substrate 34. The conductor leads 42 and 43 extend vertically downward parallel to one another and terminate slightly before the bottom of the first substrate 34. One conductor lead 43 further extends in a horizontal direction parallel to the bottom of the first substrate 34 toward the other short conductor lead 42 such that it has a general L-shape. Similarly, the long conductor leads 44 and 45 located on the rear side 56 of the second substrate 36 begin near the top of the second substrate 36 and extend parallel and vertically downward, terminating before the bottom of the second substrate 36 as can be seen in FIG. 3. Also, one long conductor 45 has a L-shape because it extends in a horizontal direction parallel to the bottom of the second substrate 36 toward the other long conductor lead 44. It will be appreciated that the orientation of the second substrate 36, as discussed above, is in the head's assembled state as depicted in FIG. 5, and that the second substrate 36 is upside down in FIG. 3.

There are two additional short conductor leads 46 and 47 attached on the rear side 56 of the second substrate 36. As discussed below, these additional short connector leads 46 and 47 cooperate with the other short connector leads 42 and 43, and the connecting pads 50-53 and 90-93 to electrically connect the first magnetoresistive stripe 30 to a flex circuit. Both the additional short conductor leads 46 and 47 are thin strips of conductive material similar to the other short conductor leads 42 and 43. The additional short conductor leads 46 and 47 are positioned near the top (as shown in FIG. 5) of the second substrate 36 and extend vertically downward parallel to the long conductor leads 44 and 45. As seen in FIG. 3, the short conductor leads 46 and 47 are approximately half the length of the long conductor leads 44 and 45. The short conductor leads 46 and 47 are parallel to the long conductor lead 44 with the long conductor lead 44 placed between the short conductor leads 46 and 47.

Figure 4:
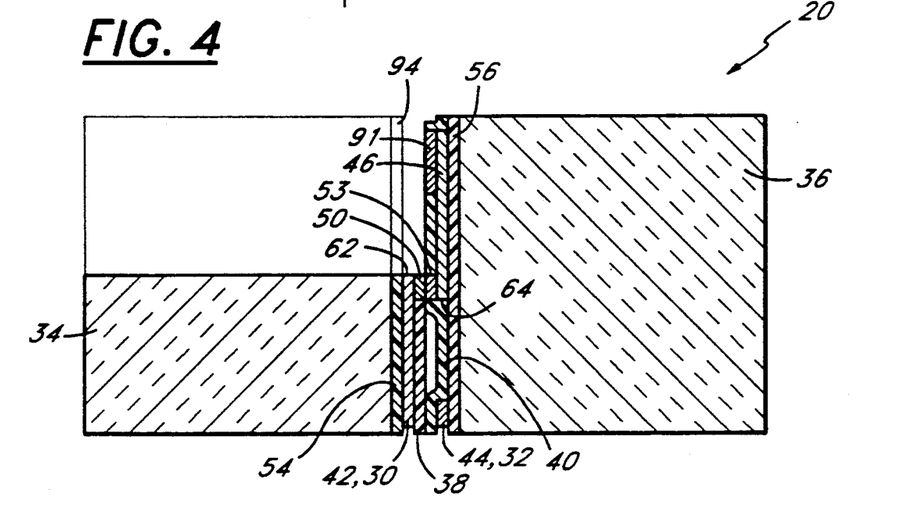
FIG. 4 is a cross-sectional side view of the dual stripe magnetic head of FIG. 1 taken along line 4—4.

The conductor leads 42-47 for both stripes 30 and 32 advantageously terminate at the top of the second substrate 36 (as shown in FIG. 5) for connection to a standard flex circuit. The short conductor leads 46 and 47 on the second substrate 36 are coupled to the short conductor leads 42 and 43 of the first substrate 34, respectively. Thus, the short conductor leads 42 and 43 on the first substrate 34 effectively terminate on the top of the second substrate 36 where the short conductor leads 46 and 47 end. As illustrated in FIG. 4, an upper end 62 of the conductor lead 42 on the first substrate 34 is connected to a bottom end 64 of the conductor lead 46 on the second substrate 36 through the connecting pads 50 and 53. The other conductor lead 43 on the first substrate 34 is electrically connected to its corresponding connector lead 47 on the second substrate 36 through the connecting pads 51 and 52 in a similar fashion.

In a preferred embodiment, the lead connecting pads 50-53 are thin square pads of gold to allow for high conductivity between the conductor leads 42, 43, 46, and 47. The connecting pads 50-53 are deposited on their respective conductor leads 42, 43, 47 and 46, and they provide electrical connection between the leads 42, 43, 46, and 47 when the first and second substrates 34 and 36 are assembled. Additionally, the connecting pads 50-53 have nearly identical dimensions and are approximately 250 A to 500 A (1 to 2 microinches) thicker than the insulation layers 38 and 40. The connecting pads 50 and 51 are placed upon the upper ends 62 and 66 of the conductor leads 42 and 43 respectively, while the connecting pads 52 and 53 are attached on the bottom ends 64 and 68 of the conductor leads 47 and 46, respectively. Additionally, flex connecting pads 90 and 92, also preferably gold, connect long connector leads 45 and 44, respectively, to a flex circuit, and flex connecting pads 91 and 93 connect short conductor leads 46 and 47 to a flex circuit.

The first and second magnetoresistive stripes 30 and 32 are joined to their respective conductor leads 42-45 in addition to the connecting pads 50-53. In the preferred embodiment, the first and second magnetoresistive stripes 30 and 32 are identical thin rectangular strips of magnetoresistive material. For example, the first and second stripes 30 and 32 may be made of Ni-Fe, Ni-Co, Mn-Fe and other materials with magnetoresistive properties. Furthermore, in the preferred embodiment, the leads 42-43 are a continuation of the first stripe 30 and the leads 44–45 are a continuation of the second stripe 32.

The first magnetoresistive stripe 30 is deposited on the front side 54 of the top gap layer 94. As shown in FIGS. 2 and 5, the first magnetoresistive stripe 30 is deposited on the top gap layer 94 so that the first magnetoresistive stripe 30 lies in a plane perpendicular to the bottom of the first substrate 34, and thus, perpendicular to the recording medium 22. The first magnetoresistive stripe 30 is also positioned with its longitudinal axis parallel to the bottom of the first substrate 34. Additionally, the first magnetoresistive stripe 30 is connected to a bottom portion 70 and 72 (FIG. 8) of each short conductor lead 42 and 43. The connector provides the electrical connection between the short conductors 42 and 43 and the first stripe 30 required to apply current.

The second magnetoresistive stripe 32 is positioned on the rear side 56 of the second substrate 36. The second magnetoresistive stripe 32 is deposited on the bottom gap layer 95 and on a bottom portion 74 and 76 (FIG. 8) of each long conductor lead 45 and 46. The second magnetoresistive stripe 32 also lies in plane perpendicular to the recording medium 22 and has its longitudinal axis parallel to the bottom of the second substrate 36. Since the second magnetoresistive stripe 32 is connected to portions 74 and 76 of the long conductor leads 44 and 45, electrical coupling for applying current to the second magnetoresistive stripe 32 is provided.

For proper operation and biasing of the dual stripe magnetic head 20, it is critical that the MR stripes 30 and 32 be aligned together as close as possible but electrically insulated. To ensure that the first and second MR stripes 30 and 32 do not make contact with each other and remain electrically insulated, two insulation layers 38 and 40 separate the stripes 30 and 32. The first insulation layer 38 is deposited on the first substrate 34 and covers the top gap 94, the short conductor leads 42 and 43, and the first magnetoresistive stripe 30. The second insulation layer 40 is deposited on the second substrate 36 and covers the bottom gap 95, the long conductor leads 44 and 45, and the second magnetoresistive stripe 32. In a preferred embodiment, the first and second insulation layers 38 and 40 are 2000 angstroms or less in thickness. In the assembly process, the first insulation layer 38 and the second insulation layer 40 are placed adjacent to each other and make contact as illustrated in FIGS. 1 and 4. This advantageously allows the first and second magnetoresistive stripes 30 and 32 to be positioned very closed together. Additionally, as shown in FIG. 4, it should be noted that the insulation layers 38 and 40 do not cover the lead connecting pads 50–53. The connecting pads 50 and 51 on the first substrate 34 penetrate through the first insulation layer 38 for electrical contact with the connecting pads 52 and 53 deposited on the second substrate 36. Thus, the first and second insulation layers 38 and 40 do not prevent an electrical path between the first magnetoresistive stripe 30 and the short leads 46 and 47 of the second substrate 36. Likewise, the flex connecting pads 90–93, permitting electrical contact between the leads 44–47 and a flex circuit.

Referring now to FIGS. 6–10, the preferred method for making dual stripe magnetic heads will be described. The present invention advantageously provides a method for constructing the dual stripe magnetic head 20 in which the MR stripes 30 and 32 can be placed in very close proximity to each other with a very low probability of electrical contact between the MR stripes 30 and 32. The preferred method additionally produces dual stripe magnetic heads with optimum performance because the first and second magnetoresistive stripes 30 and 32 can be made nearly identical in thickness and composition. Moreover, the present invention is advantageously adaptable to the manufacture of dual stripe magnetic heads in mass quantity. While the preferred method is described and shown in the context of construction of one dual stripe magnetic head 20, it should be appreciated that the method of the present invention may be also used for the mass production of dual stripe magnetic heads.

In the preferred method of the present invention, the dual stripe magnetic head 20 is constructed using a combination of layering and assembly techniques. The method of the present invention generally entails placing each magnetoresistive stripe 30 and 32 on different areas of substrate and then bringing the stripes 30 and 32 together for the proper operation of the dual stripe magnetic head 20 by assembling the first and second areas of substrate 34 and 36 together.

Figure 6:
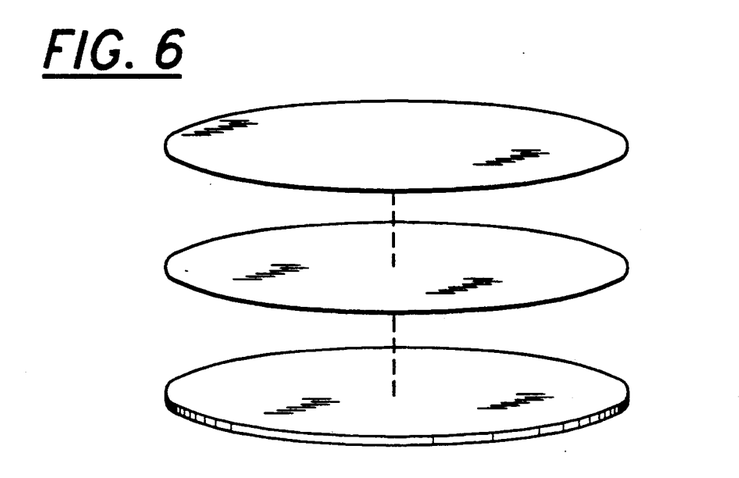
FIGS. 6-11 are top plan views of the areas of substrate and components used to construct a dual stripe magnetic head in the various stages of the method of the present invention.

In the preferred method, a single wafer 80 of substrate material, such as ferrite, is formed. As illustrated schematically in FIG. 6, a thin layer 98 of non-magnetically conductive material, such as aluminum oxide, is then deposited on the wafer 80 by means of vacuum deposition. This non-conductive layer 98 forms both the top and bottom gaps 94 and 95 when the head is assembled. As also illustrated in FIG. 6, a layer of MR material 100, such as nickel oxide, is then deposited on the layer of aluminum oxide. The MR layer 100 will eventually form the stripes 30 and 32, the conductor leads 42–47 and the targets 58 and 60.

Next, lead connecting pads 50–53 and flex 90–93 are deposited on the MR layer 100 through a first photoresist mask, in the standard manner, known in the art. Specifically, the photoresist mask is of a size and shape that covers all areas of the wafer 80 which is not being worked on in the next step. The position of the pads 50–53 and 90–93 is determined by photolithography. The first photoresist mask is then removed. A second photoresist mask is then placed over the pads 50–53 and 90–93, as well as over all those exposed portions of the MR layer 100, corresponding to the future position of the stripes 30 and 32, the conductor leads 42–47 and the targets 58 and 60. Those areas of the MR layer 100 not covered by the second photoresist mask are then removed by means of ion milling, which defines the stripes and the conductor leads. It will be appreciated that the stripes 30 and 32 and their respective leads 42–43, and 44–45 could be deposited in a separate step, this is generally not as desirable, both from the standpoint of cost and the increased thickness of the layer required to cover the stripes and leads. The targets 58 and 60 will advantageously be covered by the second mask and will be ion milled at the same time as the stripes. As will be appreciated by those of skill in the art, any of a variety of shapes of optical targets would be functional. Desirably, however, a square which would fit into one corner of the crosshairs of an optical microscope is used. The exact position of the first magnetoresistive stripe 30 with respect to the optical targets 58 is predetermined and allows for the alignment of the first magnetoresistive stripe 30 later in the assembly process.

As will be appreciated, as the MR layer 100 forms both stripes and the targets in this process, both the first and second magnetoresistive stripes 30 and 32 and their respective optical targets 58 and 60 are deposited in the same layering process. This was not possible in the prior art where the second stripe was deposited on the first stripe, thus requiring two layering processes. Depositing the stripes 30 and 32 in the same layering process advantageously results in nearly uniform composition and thickness of the stripes 30 and 32. Uniform thickness and composition of the dual stripe magnetic head 20 constructed in accordance with the method of the present invention achieves optimal performance of the head's read functions.

Figure 7:
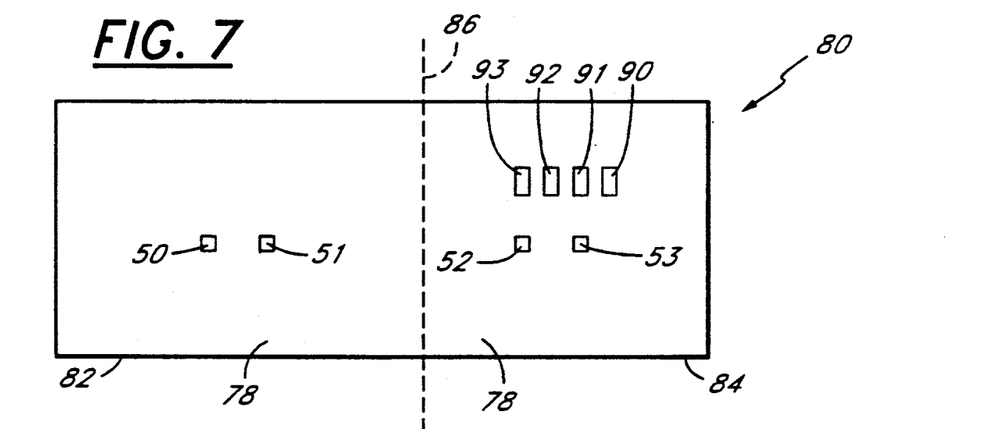
Figure 8:
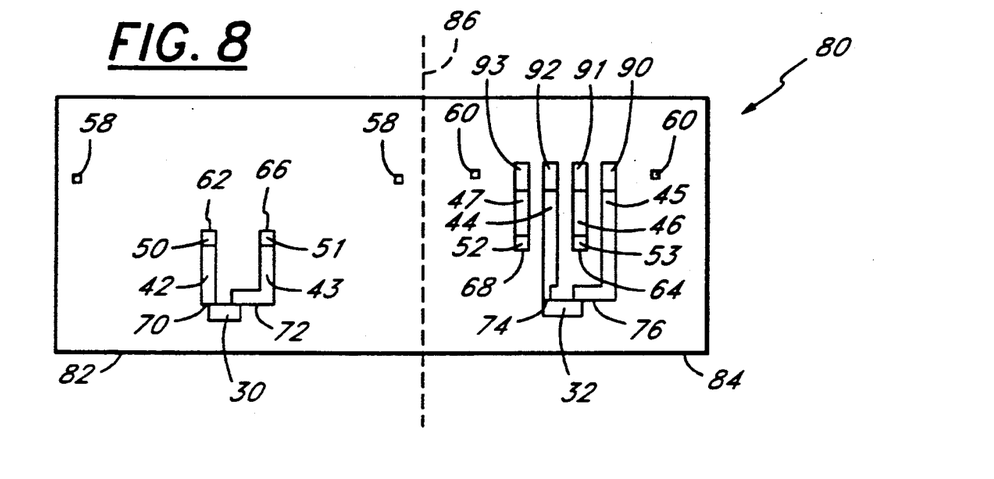

The second photoresist mask is then removed, resulting in the configuration shown in FIG. 8. As illustrated in FIG. 7, the connecting pads 50 and 51 are deposited in locations corresponding to the future upper ends 62 and 66 of the conductor leads 43 and 44, the connecting pads 52 and 53 are deposited in locations corresponding to the future bottom ends 64 and 68 of the short conductor leads 46 and 47, the connecting pads 93 and 91 are deposited in locations corresponding to the future upper ends of the short conductor leads 47 and 46, and the connecting pads 92 and 90 are deposited in locations corresponding to the future upper ends of long conductor leads 44 and 45. This configuration advantageously provides electrical coupling between conductor lead 42 and conductor lead 46 and between conductor lead 43 and conductor lead 47 when the substrates 34 and 36 are assembled together. Thus, a single flex circuit may be attached to the flex connectors 90-93 and thereby to the four conductor leads 44-47 terminating on the second substrate 36.

Figure 9:
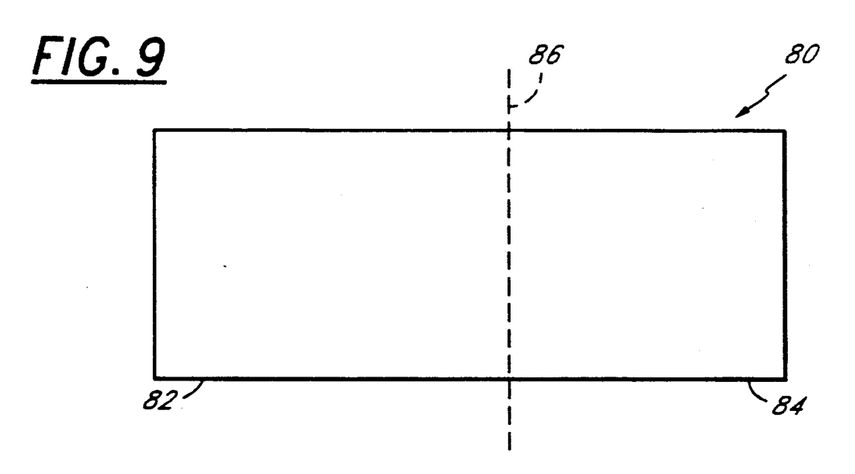

As illustrated in FIG. 9, the entire upper surface of the wafer 80 is covered with an insulation layer 102 covering the stripes 30 and 32, conductor leads 42-47, targets 58 and 60 and connector pads 50-53 and 90-93. The insulation layer 102 will prevent electrical contact between the first and second magnetoresistive stripes 30 and 32 as well as their respective conductive leads 42-45. This insulation layer 102 may comprise, for example, a layer of aluminum oxide, silicon dioxide or silicon nitrate, all of which are transparent and all for the viewing of optical targets. These thicknesses will vary, depending upon performance requirements, but would typically be about 500 A (2 microinches). These materials can also be used as bottom and top gaps. As this layer 102 is desirably transparent, the stripes 30 and 32, conductor leads 42-47, targets 58 and 60 and connector pads 50-53 and 90-93 would still be visible. However, FIG. 9 illustrates the insulation layer as obscuring these areas to clarify that the layer 102 covers the entire wafer.

A third photoresist mask is then used to protect all areas of the insulation layer 102 except for those areas of the layer covering the lead connecting pads 50-53 and the flex connecting pads 90-93. These unprotected areas of the insulation layer 102 are then removed by chemical etching to expose the lead pads 50-53 and the flex pads 90-93. Although FIG. 10 illustrates the targets 58 and 60 as being visible through the insulation layer, which they are, it should be recognized that the targets are desirably still covered by the insulation layer.

Figure 10:
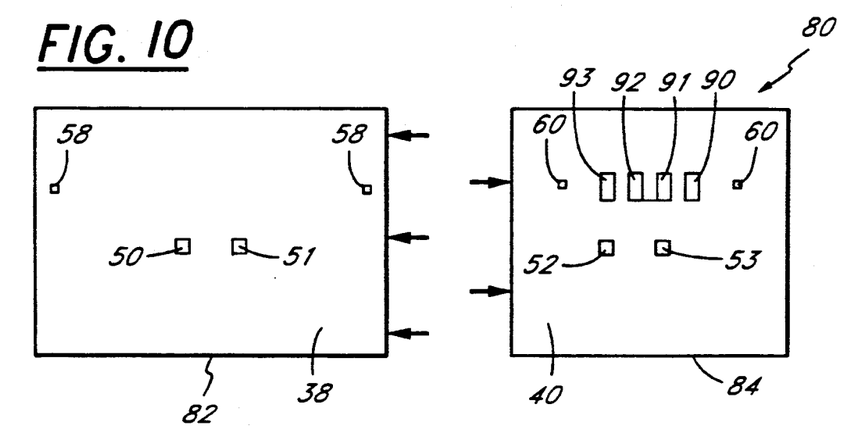
Figure 11:
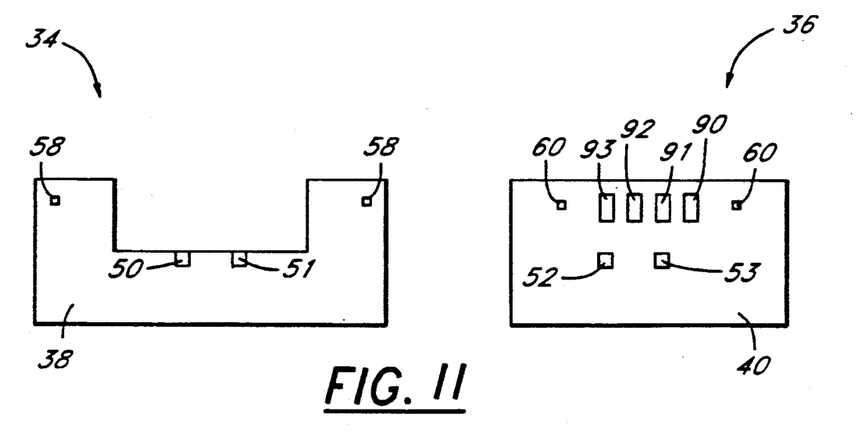

As illustrated in FIG. 10, after the etching process, the wafer 80 is cut or divided into two pieces 82 and 84 along the axis 86 indicated by the phantom line in FIG. 9. One piece 82 contains the first magnetoresistive stripe 30 and the two short conductor leads 42 and 43. The other piece 84 of wafer 80 supports the second magnetoresistive stripe 32 and the four conductor leads 44-47. Cutting the wafer 80 also creates the two insulation layers 38 and 40 from the single insulation layer 102. After the wafer 80 has been divided, the two pieces 82 and 84 are shaped into the first and second substrates 34 and 36, respectively. Since the wafer 80 is substrate material as described above, the pieces 82 and 84 can be precision machined into the substantially rectangular block shapes of FIGS. 2, 3 and 11 as desired to form the substrates 34 and 36. Additionally, the optical targets 58 and 60 identify the location of the stripes 30 and 32 and enable the substrates 34 and 36 to be shaped for proper positioning of the first and second MR stripes 30 and 32 with respect to the edges of the substrates 34 and 36. The result of the cutting and machining is two substrates 34 and 36 with all the components of the dual stripe magnetic head 20 deposited thereon as illustrated in FIG. 11.

Before the final assembly step, the first and second magnetoresistive stripes 30 and 32 must be accurately aligned for proper operation of the dual stripe magnetic head 20. The first and second magnetoresistive stripes 30 and 32 must be precisely aligned in parallel planes so that the projection of the second magnetoresistive stripe 32 onto the front side 54 of the first substrate 34 will exactly cover the first magnetoresistive stripe 30. The optical targets 58 and 60, visible on the front side 54 of the first substrate 34 and the rear side 56 of the second substrate 36, allow the first and second magnetoresistive stripes 30 and 32 to be accurately aligned in such a manner. The optical targets 58 allow the first magnetoresistive stripe 30 to be positioned with respect to the second magnetoresistive stripe 32 since the optical targets 58 and 60 are at known and predetermined distances from the stripes 30 and 32. Thus, the optical targets 58 and 60 indicate the position of the each MR stripe 30 and 32.

Figure 12:
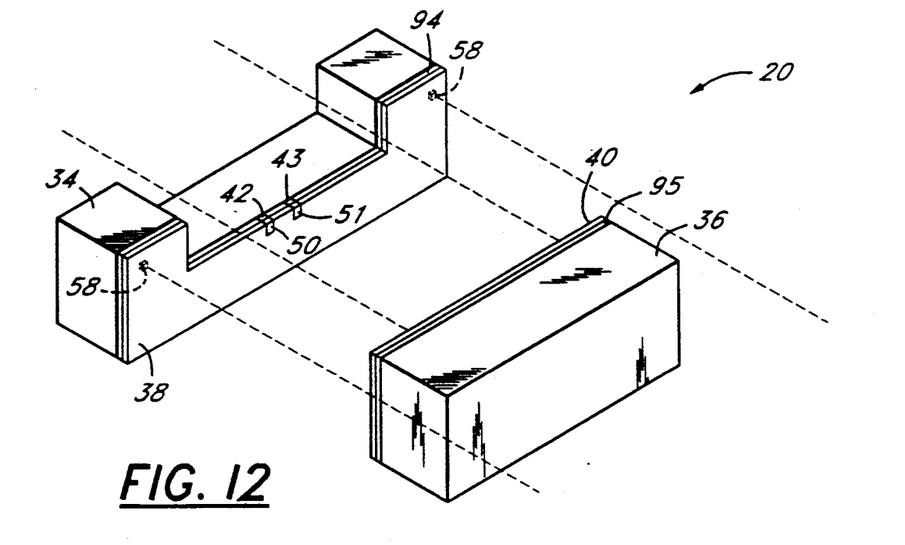
FIG. 12 is a perspective view of the dual stripe magnetic head in the assembly step of the method of the present invention.
Figure 13:
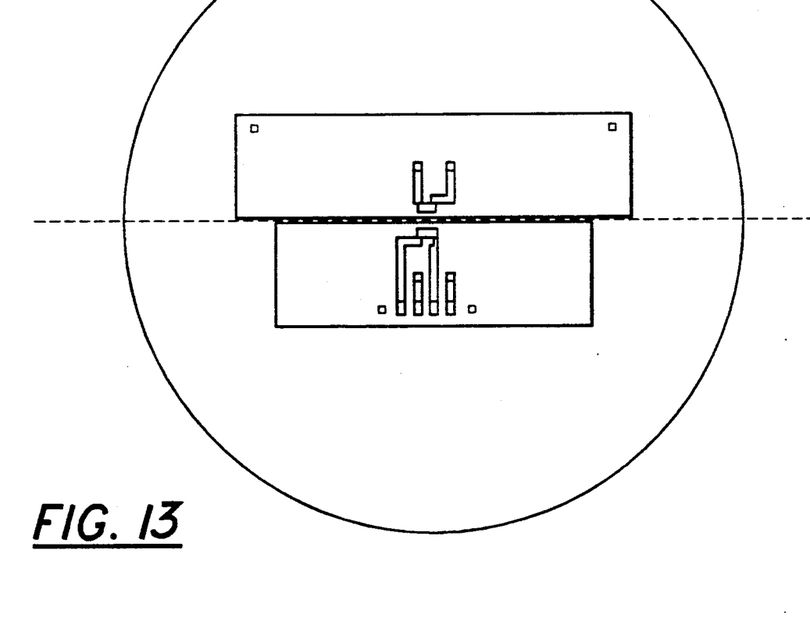
FIG. 13 is a top plan view of the first and second areas of substrate on a single wafer.

Finally, the first and second substrates 34 and 36 are assembled together to form the dual stripe magnetic head 20 of the present invention. As illustrated in FIG. 12, the substrates 34 and 36 are assembled together with the insulation layer 38 of the first substrate 34 facing the insulation layer 40 of the second substrate 36. When the substrates 34 and 36 are assembled the insulation layers 38 and 40 on each substrate 34 and 36 contact each other. Preferably, the optical targets 58 and 60 are positioned such that each of the optical targets on each substrate 34 and 36 are still visible even when the layers 38 and 40 are in contact, providing a constant check of the position of the stripes 30 and 32 during assembly, permitting the precise alignment of the stripes 30 and 32 relative one another. The lead connecting pads 50 and 51 on the first substrate 34 make contact with the lead connecting pads 53 and 52 of the second substrate 36 respectively, thereby electrically connecting the short conductors 42, 43, 46 and 47. The flex connecting pads 90-93 are exposed above the top of the first substrate 34, permitting them to be electrically connected to a flex circuit.

Utilizing the foregoing assembly process, as opposed to the standard layering process, to place the MR stripes 30 and 32 in close proximity to each other advantageously reduces the chances of electrical contact between the MR stripes 30 and 32 and their conductor leads 42-27. Using the assembly method of the present invention also eliminates any depositing of conductor or magnetoresistive material on the insulation layers 38 and 40. Therefore, the likelihood that the conductor or magnetoresistive material will penetrate the insulation and form a short circuit is greatly reduced. Additionally, much thinner layers of insulation may be used in the present method since neither conductor nor magnetoresistive material is deposited on the insulation layers 38 and 40.

Having described the invention in connection with certain preferred embodiments thereof, it will be understood that many modifications and variations thereto are possible, all of which fall within the true spirit and scope of this invention.

What is claimed is:

1. A method of making multiple stripe magnetic heads, comprising the steps of:

forming a stripe of magnetoresistive material and a first set of conductor leads on a first area of a MR shield covered by a gap layer, wherein at the completion of said steps of forming of said first set of conductor leads and forming of said first stripe, said first stripe is electrically coupled between said first set of conductor leads;

simultaneously with said forming of said stripe of magnetoresistive material, forming a first set of optical targets on said first area of substrate;

covering said first set of leads and said first stripe with a layer of insulation;

forming a second stripe of magnetoresistive material and a second set of conductor leads on a second area of MR shield covered by a gap layer, wherein at the completion of said steps of forming of said second set of conductor leads and forming of said second stripe, said second stripe is electrically coupled between said second set of conductor leads;

simultaneously with said forming of said second stripe of magnetoresistive material, forming a second set of optical targets on said second area of wafer;

covering said second set of leads and said second stripe with a layer of insulation;

using said optical targets to align said first stripe and said second stripe;

securing said first and second areas of substrate together with said first stripe and said second stripe precisely aligned in parallel planes.

2. The method of claim 1, further comprising the steps of:

forming a third set of conductor leads on said second area of substrate;

depositing a first set of connecting pads on said first set of leads on said first area of substrate, said first set of connecting pads for electrically connecting said leads on said first area of substrate to said third set of leads on said second area of substrate;

depositing a second set of connecting pads on said third set of leads on said second area of substrate, wherein said second set of connecting pads is deposited at a location such that said second set of connecting pads contacts said first set of connecting pads when said first and second areas of substrate are secured together, so as to form a continuous electrical coupling with said first and third set of leads.

3. A method of making multiple stripe magnetic heads, comprising the steps of:

forming a first set of conductor leads on a first area of substrate;

forming a first stripe of magnetoresistive material on said first area of substrate, wherein at the completion of said steps of forming of said first set of conductor leads and forming of said first stripe, said first stripe is electrically coupled between said first set of conductor leads;

covering said first stripe with a layer of insulation;

forming a second set of conductor leads on a second area of substrate;

forming a second stripe of magnetoresistive material on said second area of substrate, wherein at the completion of said steps of forming of said second set of conductor leads and forming of said second stripe, said second stripe is electrically coupled between said second set of conductor leads;

covering and said second stripe with a layer of insulation;

securing said first area of and second area of substrate together with said layers of insulation separating said first and second areas of substrate and said first stripe and said second stripe precisely aligned in parallel planes;

forming a third set of conductor leads on said second area of substrate;

depositing an upper connecting pad on said first set of leads on said first area of substrate, said upper connecting pad for electrically connecting said leads on said first area of substrate to said third set of leads on said second area of substrate;

depositing a lower connecting pad on said third set of leads on said second area of substrate, wherein said covering steps leave said pads exposed and said lower connecting pad is deposited at a location such that said lower connecting pad contacts said upper connecting pad when said first and second areas of substrate are secured together with said first stripe and said second stripe in parallel planes, so as to form a continuous electrical coupling with said first and third set of leads.

4. The method of claim 3, further comprising the steps of:

forming a first set of optical targets on said first area of substrate;

forming a second set of optical targets on said second area of substrate; and using said optical targets to align said first and said second stripes before securing together said first and second areas of substrate.

5. The method of claim 4, wherein said step of forming said first set of optical targets and said step of forming said first stripe occur simultaneously, and wherein said step of forming said second set of optical targets and said step of forming said second stripe occur simultaneously.

6. A method of making multi-stripe magnetic heads comprising the steps of:

simultaneously forming a plurality of stripes of magnetoresistive material on a single wafer of substrate material;

after said forming step, wherein at least two of said pieces include a magnetoresistive stripe; and assembling at least two of said pieces including a magnetoresistive stripe together to form a multistripe magnetoresistive head with said stripes on each piece aligned in parallel planes.

7. The method of claim 6, further comprising the step of covering said plurality of stripes with a layer of insulation before said cutting step.

8. The method of claim 7, further comprising the step of forming a plurality of optical targets corresponding to each of said stripes simultaneously with the forming of said stripes and using said optical targets to align said stripes.

9. A method of making multiple stripe magnetic heads comprising the steps of:
   forming a first set of conductor leads on a first area of substrate;
   forming a first stripe of magnetoresistive material on said first area of substrate, wherein at the completion of said steps of forming of said first set of conductor leads and forming of said first stripe, said first stripe is electrically coupled between said first set of conductor leads;
   simultaneously with said forming of said first stripe of magnetoresistive material, forming a first set of optical targets on said first area of substrate;
   covering said first set of leads and said first stripe with a layer of insulation;
   forming a second set of conductor leads on a second area of substrate;
   forming a second stripe of magnetoresistive material on said second area of substrate, wherein at the completion of said steps of forming of said second set of conductor leads and forming of said second stripe, said second stripe is electrically coupled between said second set of conductor leads;
   simultaneously with said forming of said second stripe of magnetoresistive material, forming a second set of optical targets on said second area of substrate;
   covering said second set of leads and said second stripe with a layer of insulation;
   using said first set of optical targets as a guide for shaping said first area of substrate;
   using said second set of optical targets as a guide for shaping said second area of substrate;
   securing said first and second areas of substrate together with said first stripe and said second stripe precisely aligned in parallel planes.

10. The method of claim 9, further comprising the step of using said optical targets to align said first and said second stripes before securing together said first and second areas of substrate.

11. A method of making multiple stripe magnetic heads comprising the steps of:
   forming conductor leads on a first substrate;
   forming a stripe of magnetoresistive material on said first substrate, said stripe electrically coupled between said leads;
   covering said leads and said stripe with insulation;
   forming conductor leads on a second substrate;
   forming a second stripe of magnetoresistive material on said second substrate, said second stripe electrically coupled between said leads on said second substrate;
   covering said leads on said second substrate and said second stripe with insulation; and
   assembling said first and second substrates together with said stripe and said second stripe precisely aligned in parallel planes.

12. The method of claim 11, further comprising the step of:
   optically aligning said stripe and said second stripe before assembling said first and second substrates.

13. The method of claim 11, wherein said steps of forming said stripe and said second stripe further comprise forming optical targets on said first and second substrates at predetermined locations from said first stripe and said second stripe respectively.

14. The method of claim 13, further comprising the step of:
   optically aligning said stripe and said second stripe using said optical targets before said assembling step.

15. The method of claim 11, wherein said assembling step mounts said first and second substrate together with said first stripe and said second stripe separated by said insulation on said first and second substrates.

16. The method of claim 11, further comprising the steps of:
   depositing an upper connecting pad on said leads on said first substrate, said upper connecting pad for electrically connecting said leads on said first substrate to corresponding leads on said second substrate;
   depositing a lower connecting pad on said corresponding leads on said second substrate, said lower connecting pad deposited at a location such that said lower connecting pad contacts said upper connecting pad when said first and second substrates are assembled.

17. A method of a multiple magnetoresistive stripe heat comprising the steps of:
   depositing a pair of conductor leads on a first substrate substantially parallel to each other, said leads beginning at a first edge of said first substrate and extending towards a second edge of said first substrate;
   depositing a magnetoresistive stripe on said first substrate, said stripe electrically contacting said leads near said second edge of said substrate;
   forming a layer of insulation over said stripe, said leads, and said first substrate;
   depositing a second pair of conductor leads on a second substrate substantially parallel to each other, said second pair of leads beginning at a first edge of said second substrate and extending towards a second edge of said second substrate;
   depositing a second magnetoresistive stripe on said second substrate, said second stripe electrically connected with said second pair of leads near said second edge of said second substrate;
   forming a second layer of insulation over said second stripe, said second pair of leads and said second substrate; and
   assembling said first and said second substrates together to form a dual stripe magnetoresistive head, said layer of insulation adjacent said second layer of insulation, and said stripe aligned with said second stripe.

18. A method for making multiple stripe magnetic heads comprising the steps of:
   forming conductor leads on a wafer of substrate material;
   forming of magnetoresistive material on said wafer, each said stripe electrically coupled between a different pair of said leads;
   covering said leads and said stripes with insulation;
   dividing said wafer into a plurality of substrate pieces, each said piece having insulation, one said stripe and a pair of said leads attached thereon; and
   assembling at least two of said pieces together to form a dual stripe magnetoresistive head with said stripes on each said piece precisely aligned in parallel planes.

* * * * *